US009235897B2

(12) United States Patent
Kakuko et al.

(10) Patent No.: US 9,235,897 B2
(45) Date of Patent: Jan. 12, 2016

(54) STEREOSCOPIC IMAGE GENERATING DEVICE AND STEREOSCOPIC IMAGE GENERATING METHOD

(75) Inventors: Norihiro Kakuko, Kawasaki (JP); Teruyuki Sato, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 543 days.

(21) Appl. No.: 13/606,445

(22) Filed: Sep. 7, 2012

(65) Prior Publication Data

US 2013/0135439 A1    May 30, 2013

(30) Foreign Application Priority Data

Nov. 29, 2011    (JP) .................................. 2011-260857

(51) Int. Cl.
*G06K 9/46* (2006.01)
*G06T 7/00* (2006.01)
*H04N 13/00* (2006.01)
*G06K 9/00* (2006.01)

(52) U.S. Cl.
CPC ............... *G06T 7/0051* (2013.01); *G06T 7/002* (2013.01); *H04N 13/00* (2013.01); *G06T 2207/10012* (2013.01)

(58) Field of Classification Search
CPC .................. G06T 7/204; G06T 7/0044; G06T 2207/10021; G06T 2207/20164; G06T 2207/30212; G06T 2207/30252; G06T 7/0075; G06K 9/32; G06K 2209/40; G01C 3/14
See application file for complete search history.

(56) References Cited

U.S. PATENT DOCUMENTS

| | | | | |
|---|---|---|---|---|
| 5,606,627 | A * | 2/1997 | Kuo ............................... | 382/154 |
| 2007/0263924 | A1 * | 11/2007 | Kochi et al. .................. | 382/154 |
| 2008/0144925 | A1 * | 6/2008 | Zhu et al. ..................... | 382/154 |
| 2009/0175498 | A1 * | 7/2009 | Kochi et al. .................. | 382/103 |
| 2011/0025825 | A1 * | 2/2011 | McNamer et al. ............. | 348/46 |
| 2011/0025829 | A1 * | 2/2011 | McNamer et al. ............. | 348/50 |

(Continued)

FOREIGN PATENT DOCUMENTS

| | | |
|---|---|---|
| JP | 2004-235934 | 8/2004 |
| JP | 2010-014450 | 1/2010 |

OTHER PUBLICATIONS

"Parametrisation and Probability in Image Alignment", N. Molton et al., University of Oxford, UK, 3003.*

(Continued)

*Primary Examiner* — Chikaodili E Anyikire
*Assistant Examiner* — Dramos I Kalapodas
(74) *Attorney, Agent, or Firm* — Fujitsu Patent Center

(57) ABSTRACT

A stereoscopic image generating device includes: a correction parameter calculating unit that calculates correction parameters based on a plurality of pairs of feature points corresponding to the same points on the object, from the first image and a second image photographing the object; a correction error calculating unit that, for each pair of feature points, corrects the position of the feature point on at least one image, using the correction parameters, and calculates the amount of correction error; a maldistribution degree calculating unit that finds the degree of maldistribution of feature points; a threshold value determining unit that determines a threshold value such that the threshold value is smaller when the degree of maldistribution increases; and a correction unit that, when the amount of correction error is equal to or lower than the threshold value, corrects the position of the object in the images using the correction parameters.

8 Claims, 10 Drawing Sheets

(56) References Cited

U.S. PATENT DOCUMENTS

| | | | |
|---|---|---|---|
| 2011/0096957 A1* | 4/2011 | Anai | G01C 11/10 |
| | | | 382/106 |
| 2011/0210965 A1* | 9/2011 | Thorpe | 345/419 |
| 2012/0242794 A1* | 9/2012 | Park et al. | 348/46 |
| 2012/0249750 A1* | 10/2012 | Izzat | G06T 7/0022 |
| | | | 348/47 |
| 2012/0293667 A1* | 11/2012 | Baba | H04N 13/0246 |
| | | | 348/187 |
| 2013/0002814 A1* | 1/2013 | Park et al. | 348/43 |
| 2013/0004059 A1* | 1/2013 | Said | G06T 7/0028 |
| | | | 382/154 |
| 2013/0016186 A1* | 1/2013 | Atanassov et al. | 348/47 |
| 2013/0051659 A1* | 2/2013 | Yamamoto | H04N 13/026 |
| | | | 382/154 |
| 2013/0083002 A1* | 4/2013 | Hwang et al. | 345/419 |

OTHER PUBLICATIONS

"Feature tracking and optical flow", by Derek Hoiem, University of Illinois, Feb. 9, 2012.*

Mikio Takagi et al., "Handbook of Image Analysis," University of Tokyo Press (1991), pp. 584-585, with partial English translation.

* cited by examiner

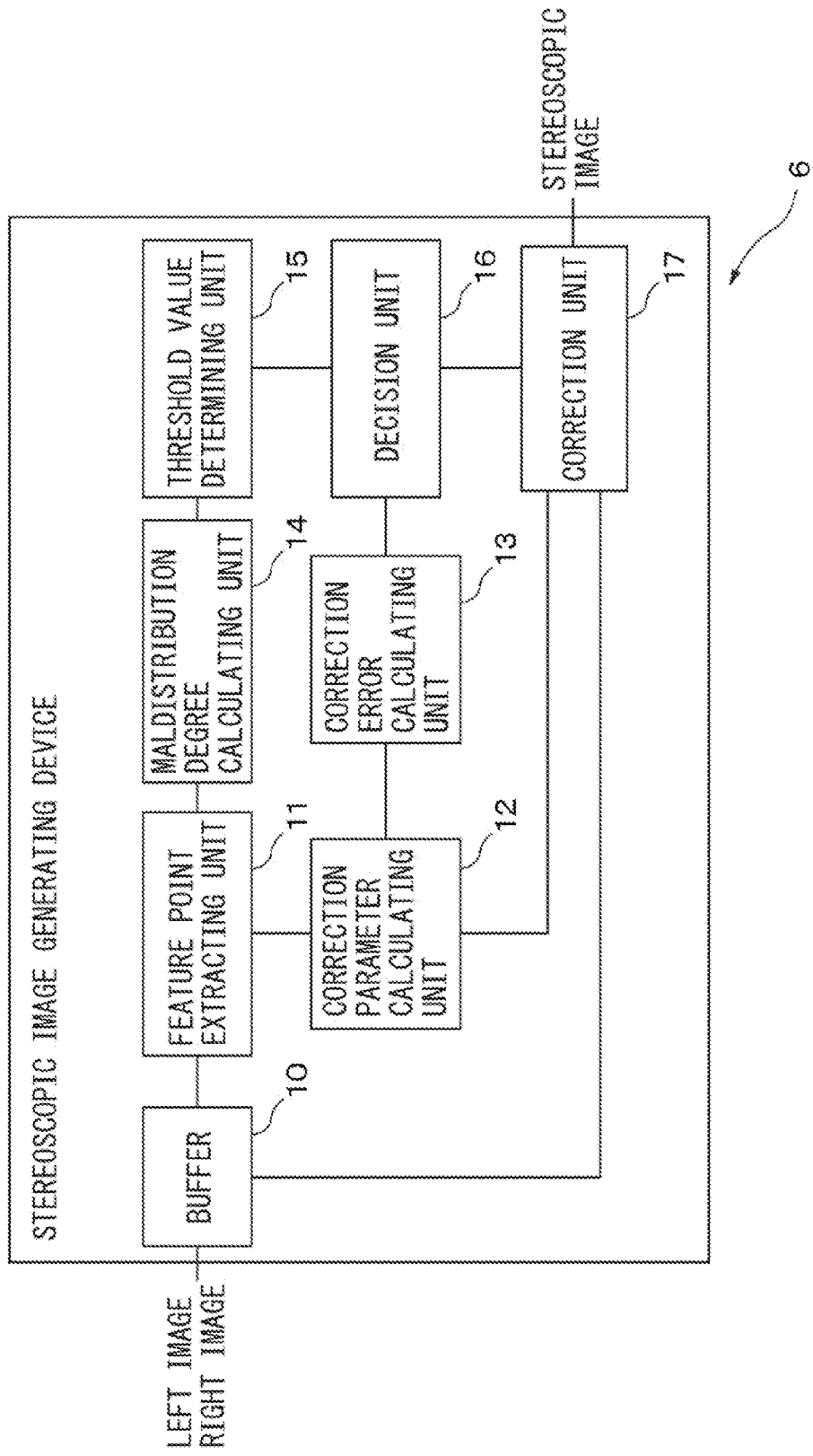

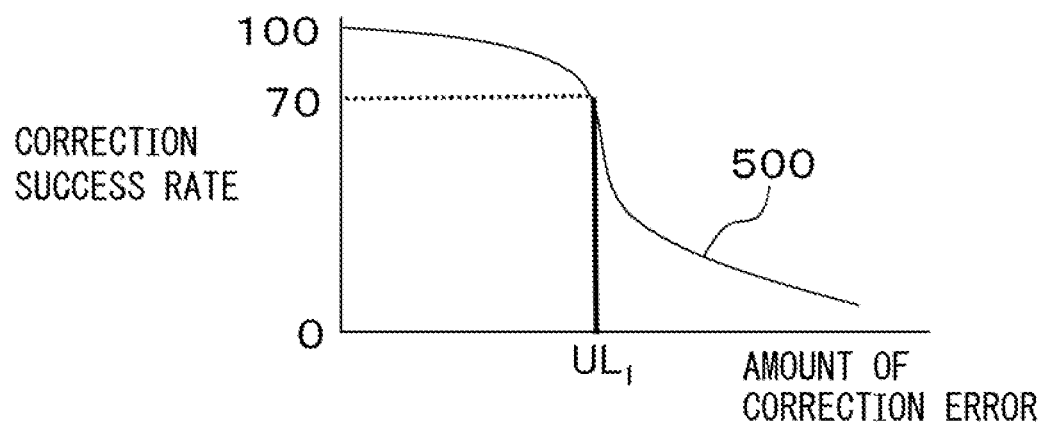
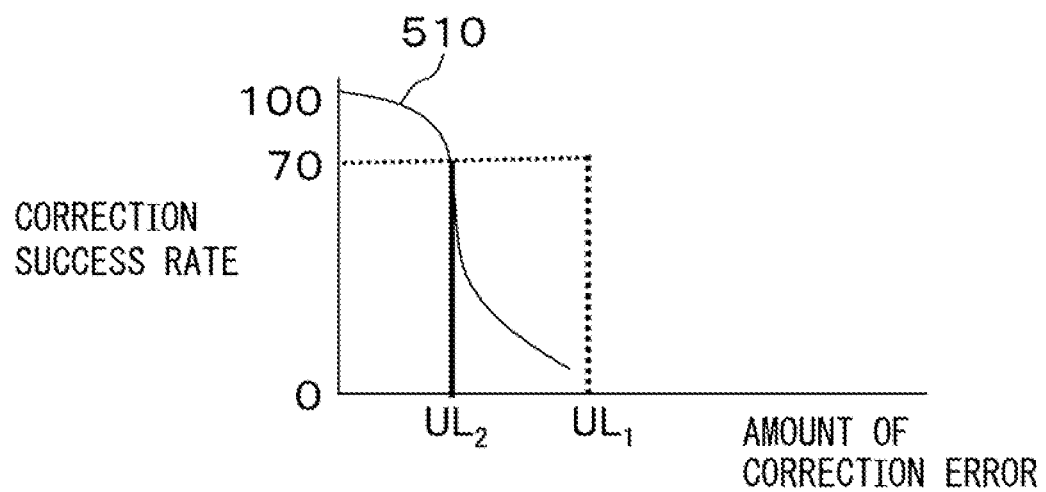

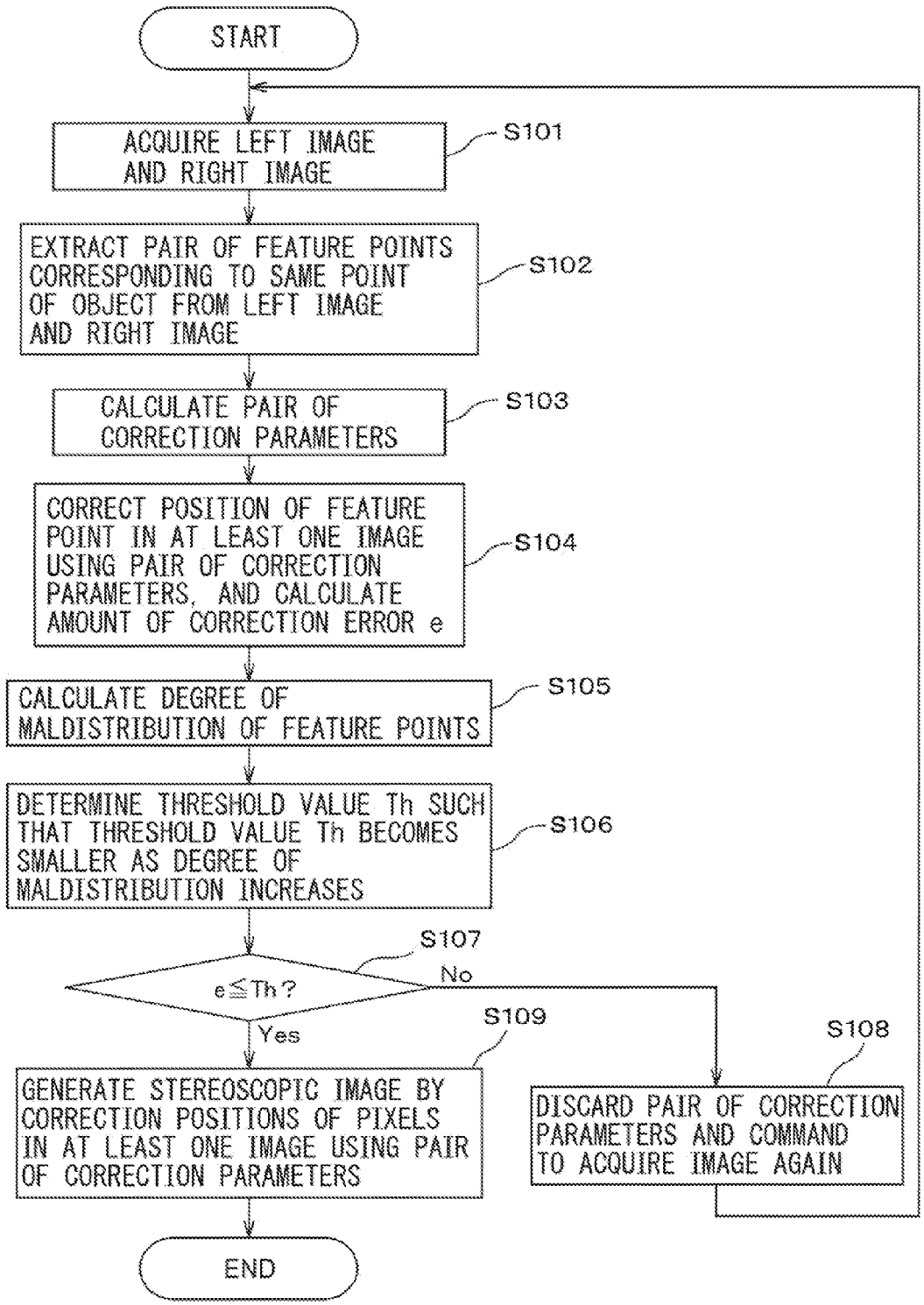

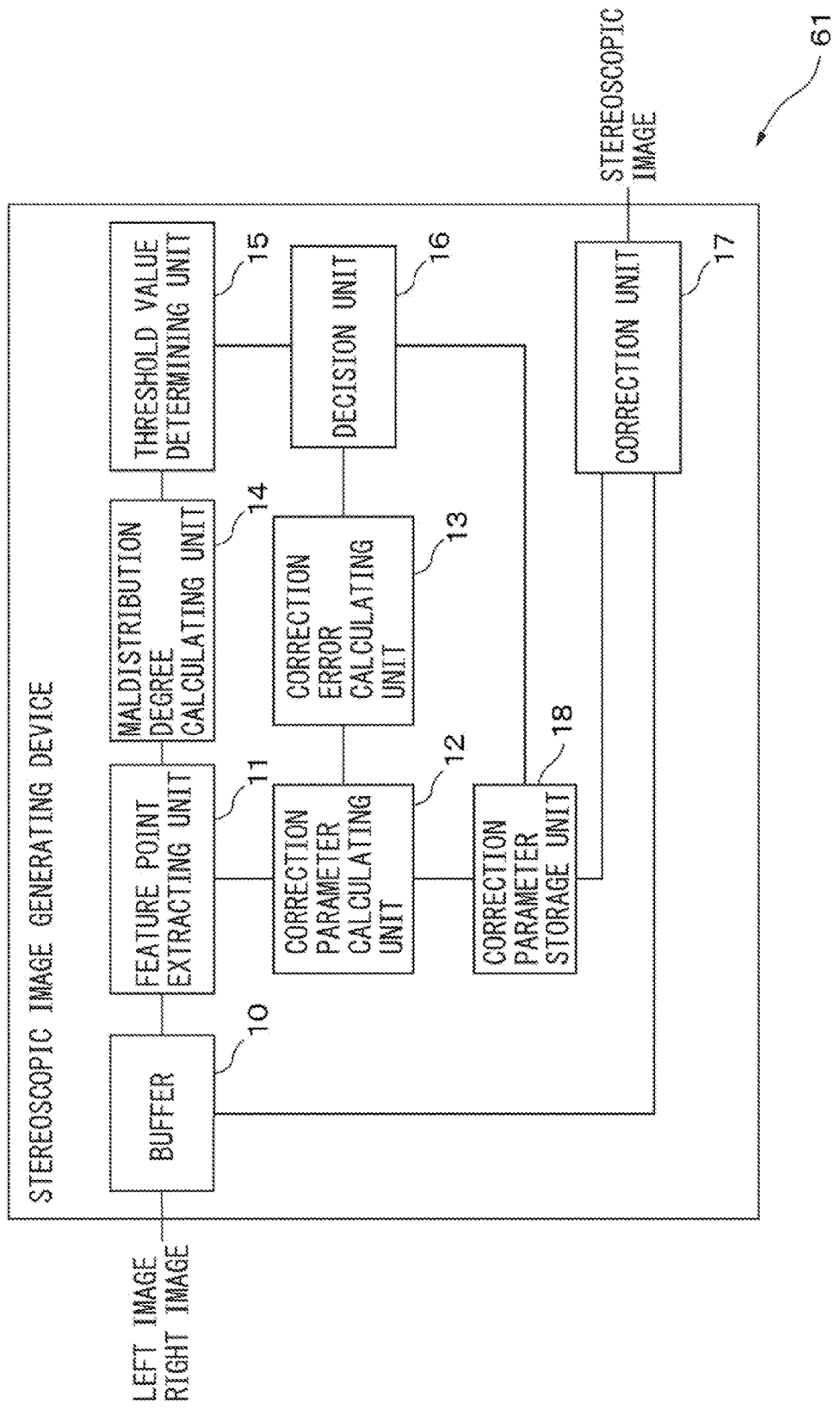

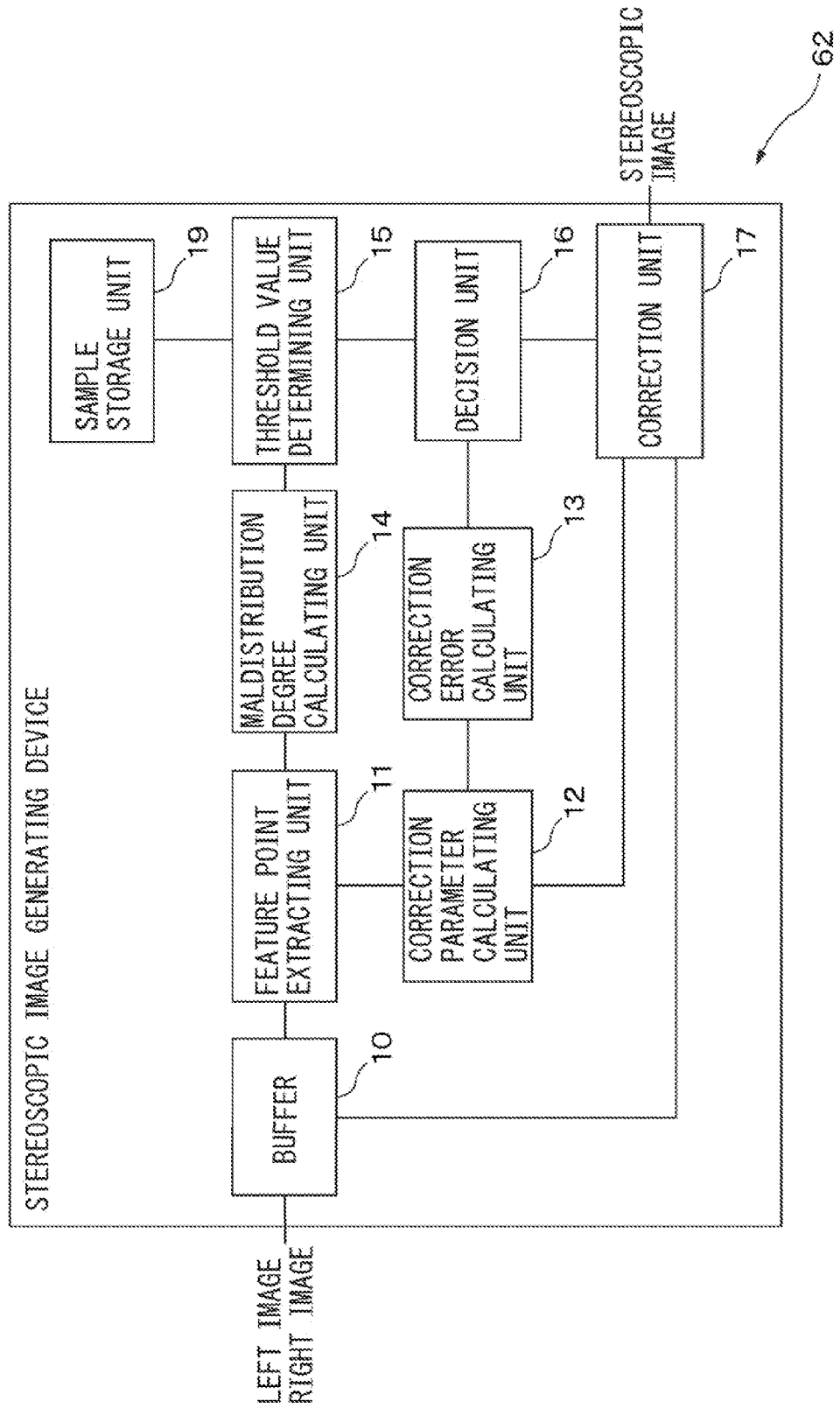

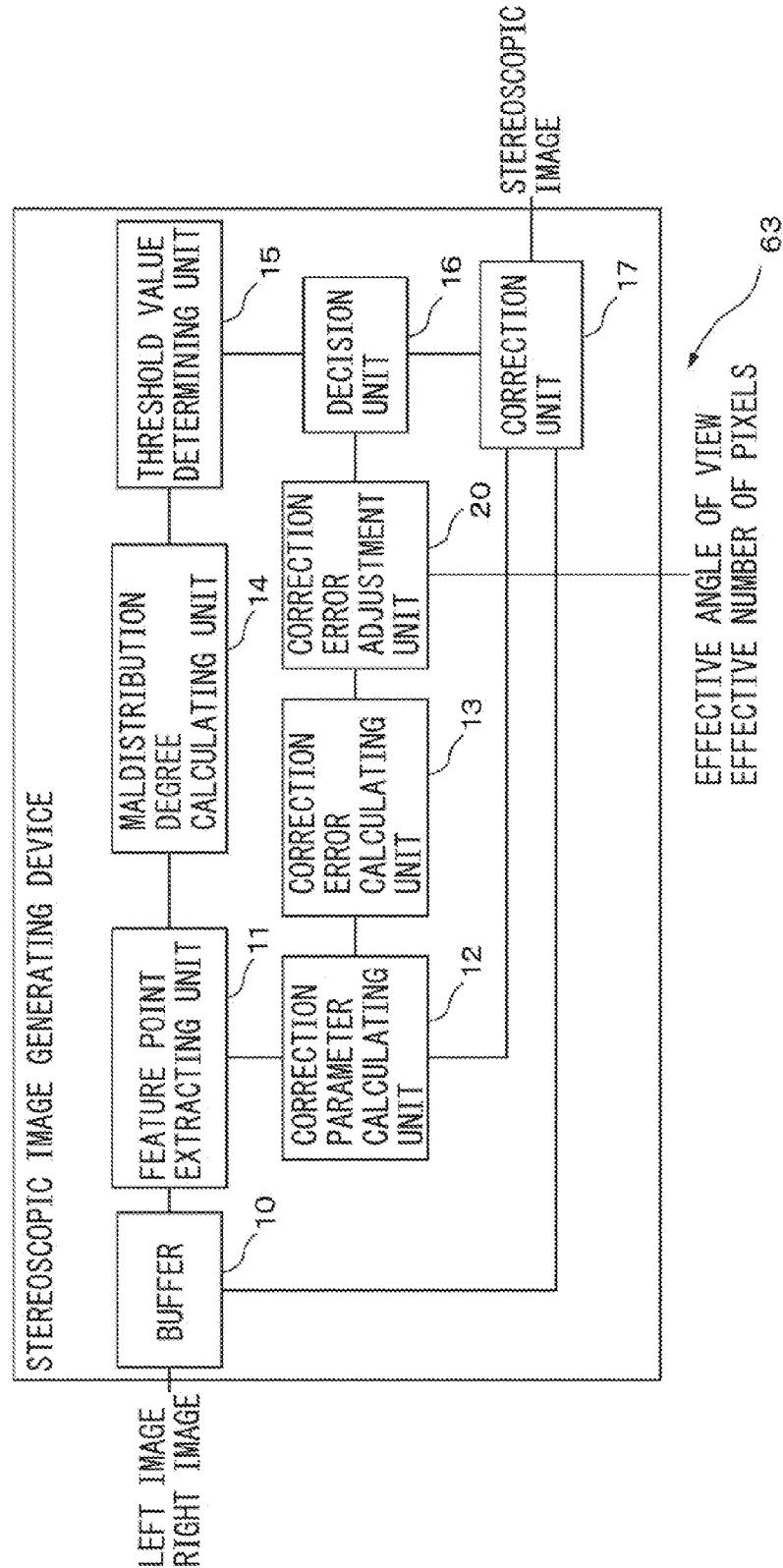

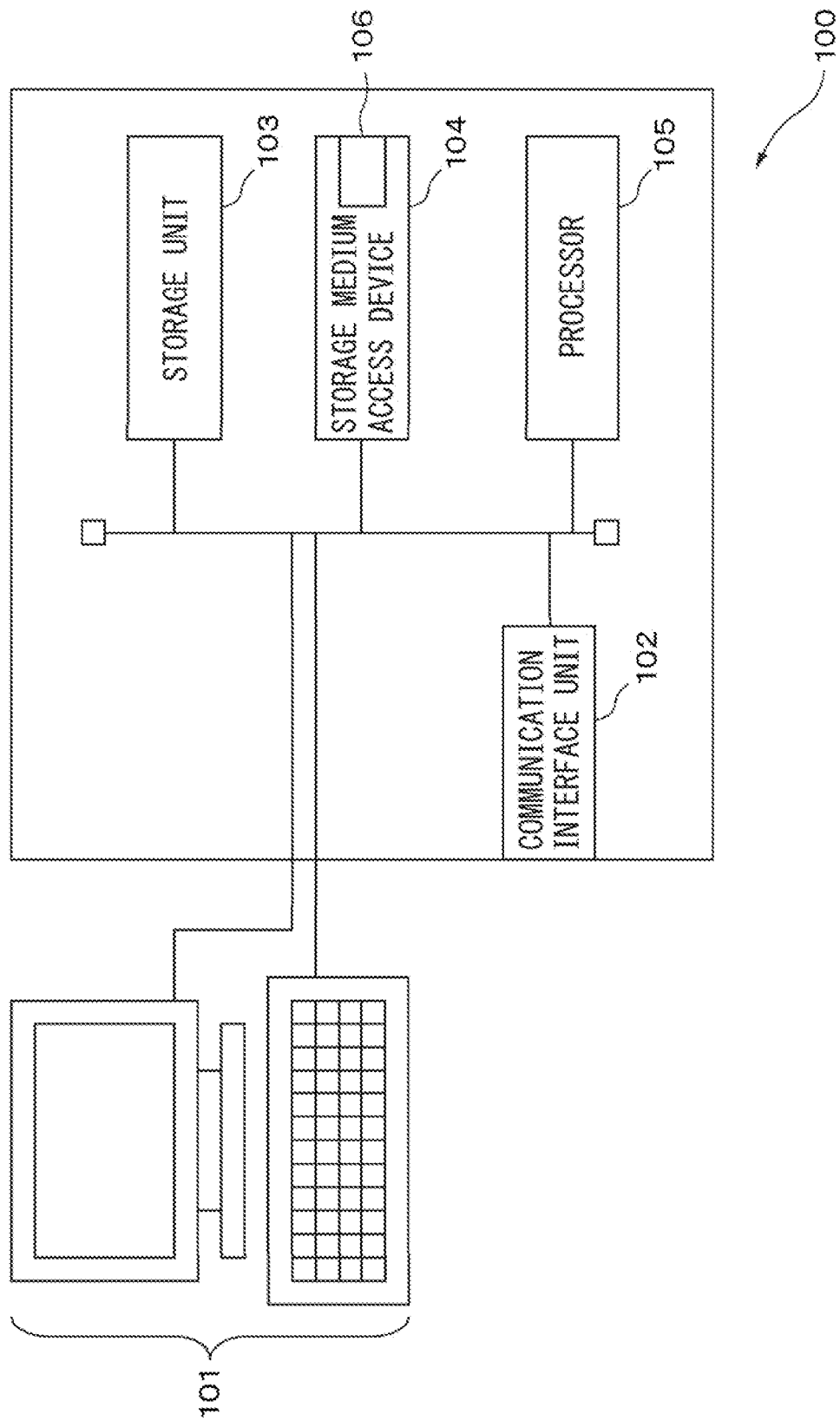

STEREOSCOPIC IMAGE GENERATING DEVICE AND STEREOSCOPIC IMAGE GENERATING METHOD

CROSS-REFERENCE TO RELATED APPLICATION

This application is based upon and claims the benefit of priority of prior Japanese Patent Application No. 2011-260857, filed on Nov. 29, 2011, the entire contents of which are incorporated herein by reference.

FIELD

The embodiments discussed herein are related to a stereoscopic image generating method and a stereoscopic image generating device for generating a stereoscopic image from two images of an object photographed from different directions.

BACKGROUND

Heretofore research for producing three-dimensional images has been made. As one method of producing a three-dimensional image, the method of displaying two images of an object photographed from different directions side by side, and showing these two images to a viewer's left eye and right eye respectively, has been known. A pair of two images used in this method is referred to as a stereoscopic image.

Two images that are contained in a stereoscopic image are to be viewed by the viewer's left eye and right eye separately, and therefore, to produce a three-dimensional image of good quality, these two images in which the object is captured are preferably photographed under the same conditions as when the viewer normally sees things. However, there are cases where, for example, the camera module for photographing the left-eye image and the camera module for photographing the right-eye image are placed aside from their adequate positions, within a range of mounting tolerances for camera modules. As a result of this, the object captured in these two images may be set aside from their adequate positions in a vertical direction or in a horizontal direction, or the object captured in one image might rotate on the image, against the object captured in the other image. In such cases, to generate a stereoscopic image which can produce a good three-dimensional image, a calibration process is executed to determine a set of correction parameters which sets forth the projective transformation for correcting the position of the object captured in at least one image.

Heretofore, in the calibration process, the user has to adjust the position of the object of the left-eye image or the position of the object of the right-eye image while looking with his/her eyes, which are very inconvenient for the user. In particular, if the user is a beginner, it is difficult to perform the calibration process adequately.

Meanwhile, a technique of automatically adjusting, based on each object on two images, the position of each object on the two images, has been proposed. This technique finds a plurality of pairs of feature points on each image corresponding to the same points on the object, and determines a projective transformation matrix for adjusting the position of the object on each image based on these feature points. Then, according to the projective transformation matrix, the positions of pixels in one image are transformed (see, for example, Mikio Takagi, Haruhisa Shimoda, Handbook of Image Analysis, University of Tokyo Press, 1991, pp. 584-585). However, if pairs of feature points are maldistributed on an image, the deviation of the object on two images in an area where there are no feature points is not reflected in the projective transformation matrix, and therefore the object may not be positioned accurately over the entire image. Then, a technique of making adjustments such that pairs of feature points are not maldistributed on an image, is proposed (see, for example, Japanese Laid-open Patent Publication No. 2010-14450 and Japanese Laid-open Patent Publication No. 2004-235934). For example, Japanese Laid-open Patent Publication No. 2010-14450 discloses a technique of detecting feature points in an area where the density of feature points extracted from each image is low, and using these detected feature points to position the two images.

Also, Japanese Laid-open Patent Publication No. 2004-235934 proposes a technique of extracting, from image data of a plurality of cameras having photographed a moving sphere from different viewpoint directions, the center position of the sphere in each camera's corresponding frames, as feature points, and calculating the calibration parameters based on the extracted feature points. With this technique, when feature points are maldistributed, the sphere is moved and images are acquired again, and feature points are extracted. Also, this technique eventually utilizes calibration parameters that are calculated when feature points are decided not to be present.

SUMMARY

However, in an area where the density of feature points on an image is low, it may not be possible to extract feature points. For example, if part of the object includes a uniform object such as walls and skies, it is difficult to extract feature points from the area where the uniform object is captured. In this case, in an area where the density of feature points is low, feature points corresponding to the same points of the object may not be extracted from each image. Consequently, a feature point in one image corresponding to a given point of the object may be associated erroneously with a feature point in the other image corresponding to a different point from that point of the object, and, as a result inadequate correction parameters may be provided.

Also, even if feature points are maldistributed, correction parameters to be determined from these feature points may nevertheless be adequate to generate a stereoscopic image. However, with the technique disclosed in Japanese Laid-open Patent Publication No. 2004-235934, when feature points are decided to be maldistributed, without even deciding whether or not the correction parameters to be found from these feature points are adequate, images are acquired and feature points are extracted again. Consequently, with the technique disclosed in Japanese Laid-open Patent Publication No. 2004-235934, the amount of calculation to be required to calculate the correction parameters may increase purposelessly. Consequently, there is a demand for a stereoscopic image generating device that can decide whether or not the correction parameters that are calculated when feature points are maldistributed on images by each camera are adequate.

According to one embodiment, a stereoscopic image generating device is provided, which includes: a feature point extracting unit that extracts, from a first image that is generated by photographing an object by a first camera, and a second image that is generated by photographing the object by a second camera, a plurality of pairs of feature points corresponding to same points on the object; a correction parameter calculating unit that calculates at least one correction parameter to correct deviation between a position of the object on the first image and the position of the object on the second image, based on the plurality of pairs of feature points; a correction error calculating unit that, for each of the plurality of pairs of feature points, corrects a position of the feature point of at least one of the first image and the second image, using the correction parameter, finds a distance between feature points corresponding to same point on the object after the correction, and calculates an amount of correction error, which represents a statistic of the distance; a maldistribution degree calculating unit that finds a degree of maldistribution of feature points in one of the first image and the second image; a threshold value determining unit that determines a threshold value for the amount of correction error such that the threshold value is smaller when the degree of maldistribution increases; a decision unit that discards the correction parameter when the amount of correction error is greater than the threshold value; and a correction unit that, when the amount of correction error is equal to or lower than the threshold value, generates a stereoscopic image by correcting at least one of the position of the object on the first image and the position of the object on the second image using the correction parameter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a configuration diagram of a stereoscopic image generating device according to the first embodiment.

FIG. 5A is a diagram illustrating one example of the relationship between the amount of correction error and the probability that the residual error mean becomes equal to or lower than a tolerable upper limit when the degree of maldistribution of feature points is relatively low.

FIG. 5B is a diagram illustrating one example of the relationship between the amount of correction error and the probability that the residual error mean becomes equal to or lower than a tolerable upper limit when the degree of maldistribution of feature points is relatively high.

FIG. 6 is an operation flowchart of a stereoscopic image generation process.

FIG. 7 is a configuration diagram of a stereoscopic image generating device according to a second embodiment.

FIG. 8 is a configuration diagram of a stereoscopic image generating device according to a third embodiment.

FIG. 9 is a configuration diagram of a stereoscopic image generating device according to a fourth embodiment.

FIG. 10 is a configuration diagram of a computer that operates as a stereoscopic image generating device by executing a computer program to realize the functions of the units of a stereoscopic image generating device according to an embodiment or its variation operates.

DESCRIPTION OF EMBODIMENTS

Stereoscopic image generating devices according to various embodiments or their variations will be described with reference to the accompanying drawings. The stereoscopic image generating device detects a plurality of pairs of feature points corresponding to the same points on the object, from images generated respectively by two cameras, and calculating a set of correction parameters based on these plurality of pairs of feature points. Also, when the position of the object on one image is corrected by the calculated set of correction parameters, this stereoscopic image generating device finds the amount of correction error, which is the statistic of the deviation between the position of a feature point on the image after the correction and the position of the corresponding feature point on the other image. Then, this stereoscopic image generating device finds the degree of maldistribution of pairs of feature points on an image, sets the threshold value to serve as a tolerable upper limit for the amount of correction error to a smaller value when the degree of maldistribution is greater, and decides that the set of correction parameters is adequate to generate a stereoscopic image when the amount of correction error is equal to or lower than that threshold value.

According to the present embodiment, the stereoscopic image generating device is incorporated in a digital camera having two camera modules. However, this stereoscopic image generating device is applicable to various devices that can acquire two images photographing the same object from different directions, such as a TV telephone system having two cameras for image input use.

Figure 1:
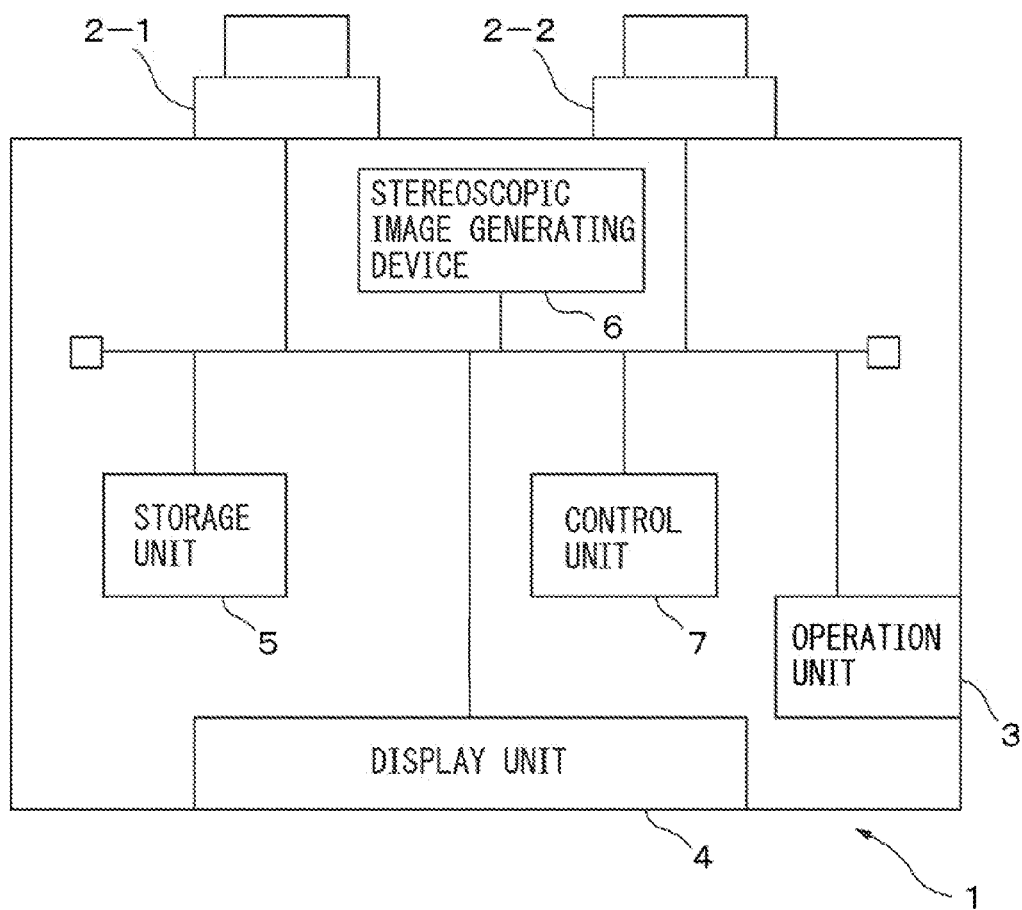
FIG. 1 is a general configuration diagram of a digital camera incorporating a stereoscopic image generating device.

FIG. 1 is a general configuration diagram of a digital camera incorporating a stereoscopic image generating device. As illustrated in FIG. 1, a digital camera 1 is one example of a stereoscopic imaging device, and includes two camera modules 2-1 and 2-2, an operation unit 3, a display unit 4, a storage unit 5, a stereoscopic image generating device 6 and a control unit 7. Furthermore, a digital camera 1 may have an interface circuit (not illustrated) that complies with a serial bus standard such as the universal serial bus, to connect the digital camera 1 with other devices such as computers and televisions. Also, the control unit 7 and the other units of the digital camera 1 are connected by, for example, a bus.

The camera module 2-1 is a camera module that generates left-eye images, and the camera module 2-2 is a camera module to generate right-eye images. Accordingly, the camera modules 2-1 and 2-2 have an image sensor having an array of solid state imaging elements that are arranged in a two-dimensional arrangement, and an imaging optical system that forms an image of the object on that image sensor.

The camera modules 2-1 and 2-2 are preferably arranged a predetermined interval apart in a substantially horizontal direction so as to be able to photograph areas including the same object and generate a stereoscopic image for producing a three-dimensional image of that object. Consequently, the camera modules 2-1 and 2-2 are accommodated in, for example, predetermined positions in one housing (not illustrated). However, as will be described later, a stereoscopic image generating device 6 calculates a set of correction parameters for correcting the position of the object captured in at least one image. Consequently, the arrangement of the camera module 2-1 and camera module 2-2 does not have to be adjusted so strictly that images generated by these camera modules become a stereoscopic image as is. In addition, the focal distance of the imaging optical system and the number of pixels of the image sensor are preferably the same between the camera modules 2-1 and 2-2, so that the size of the object on the image generated by the camera module 2-1 and the size of the same object on the image generated by the camera module 2-2 are substantially equal. The camera modules 2-1 and 2-2, upon generating images, transmit the generated images to the stereoscopic image generating device 6. Note that, hereinafter, for ease of explanation, a left-eye image that is generated in the camera module 2-1 will be referred to as a "left image" and a right-eye image that is generated in the camera module 2-2 will be referred to as a "right image".

The operation unit 3 has, for example, various operation buttons or dial switches to allow the user to operate the digital camera 1. Then, the operation unit 3 transmits control signals for starting photographing, focusing, and setup signals for setting the shutter speed, aperture diameter to a control unit 7.

The display unit 4 has, for example, a display device such as a liquid crystal display device, and displays various information that is received from the control unit 7 or images generated by the camera modules 2-1 and 2-2. Note that the operation unit 3 and display unit 4 may be formed integrally using, for example, a touch panel display.

The storage unit 5 has, for example, a readable and writable, and volatile or non-volatile semiconductor memory circuit. Then, the storage unit 5 stores a stereoscopic image that is generated by the stereoscopic image generating device 6. Also, the storage unit 5 may store the left image and right image received from the camera modules 2-1 and 2-2. Furthermore, if the functions of the stereoscopic image generating device 6 are realized by a computer program that is executed on a processor provided in the control unit 7, the computer program may be stored as well.

The stereoscopic image generating device 6 determines, from the left image and right image photographing the same object, a set of correction parameters for positioning the objects captured in the left image and the right image, and corrects at least one of the left image and the right image using that set of correction parameters. Note that the details of the stereoscopic image generating device 6 will be described later.

The control unit 7 has at least one processor and its peripheral circuitry. Then, the control unit 7 controls the entirety of the digital camera 1.

FIG. 2 is a configuration diagram of a stereoscopic image generating device 6. As illustrated in FIG. 2, the stereoscopic image generating device 6 includes a buffer 10, a feature point extracting unit 11, a correction parameter calculating unit 12, a correction error calculating unit 13, a maldistribution degree calculating unit 14, a threshold value determining unit 15, a decision unit 16, and a correction unit 17. These units provided in the stereoscopic image generating device 6 may be mounted in the stereoscopic image generating device 6 each as a separate circuit, or may be provided as one integrated circuit that realizes the functions of these units.

Alternately, the stereoscopic image generating device 6 may be formed integrally with the control unit 7. In this case, these units provided in the stereoscopic image generating device 6 are implemented as, for example, function modules to be realized by a computer program that is executed on a processor provided in the control unit 7. Then, various data that is generated by the stereoscopic image generating device or that is utilized by the stereoscopic image generating device may be stored in a storage unit 5.

The buffer 10 has, for example, a volatile semiconductor memory circuit and stores the left image and right image that are received as input in the stereoscopic image generating device 6 on a temporary basis.

A feature point extracting unit 11 reads the left image and right image from the buffer 10, and, from these left image and right image, extracts a plurality of pairs of feature points corresponding to the same points on the object. With the present embodiment, the feature point extracting unit 11 extracts the first candidate point, which is a candidate of a feature point, from one of the left image and the right image, and searches for a second candidate point that matches the candidate point in the other image. Then, the feature point extracting unit 11 finds a third candidate point that matches the second candidate point detected in the other image, in the image from which the first candidate point has been extracted. Then, when the first candidate point and the third candidate point can be regarded as virtually equal, the feature point extracting unit 11 makes the first candidate point or the third candidate point, and the second candidate point, a pair of feature points. By this means, the feature point extracting unit 11 is able to accurately extract feature points on the left image and feature points on the right image corresponding to the same part of the object.

First, to extract the first candidate point from one image, the feature point extracting unit 11, for example, makes a plurality of points that are detected by applying a corner detector to the left image, each a first candidate point. Note that the feature point extracting unit 11 can use, for example, a Harris detector as the corner detector. Also, the feature point extracting unit 11 may use a detector other than a corner detector that detects characteristic points, other than a corner detection, to extract the first candidate points from the left image. As such a detector, for example, the feature point extracting unit 11 might use a scale-invariant feature transform (SIFT) detector.

Next, for every first candidate point extracted from the left image, the feature point extracting unit 11 sets a predetermined area around that first candidate point, as a template. Then, the feature point extracting unit 11 performs template matching while changing relative positions between that template and the right image, and finds, for example, a normalized cross-correlation value. Then, the feature point extracting unit 11 finds the pixel on the right image corresponding to the center of the template, as of when the normalized cross-correlation value is the maximum, i.e., as of when the right image and the template match the most, as a second candidate point.

Similarly, the feature point extracting unit 11 sets a predetermined area around the second candidate point as a re-search template. Then, the feature point extracting unit 11 performs template matching while changing relative positions between the re-search template and the left image, and finds, for example, a normalized cross-correlation value. Then, the feature point extracting unit 11 finds the pixel on the left image corresponding to the center of the re-search template, as of when the normalized cross-correlation value is the maximum, i.e., when the left image and the re-search template match the most, as a third candidate point. The feature point extracting unit 11 finds the distance between the third candidate point and the original first candidate point, and, when the distance is equal to or lower than a predetermined distance threshold value, makes the first candidate point or third candidate point on the left image, and the second candidate point on the right image, a pair of feature points corresponding to the same part. Note that the predetermined area is preferably a size to allow the degree of match of the structure of the object around a candidate point to be checked, and a size to reduce the influence of difference in the photographing direction. For example, the predetermined area may be a rectangular area having, in both the horizontal direction and the vertical direction, a length of approximately 1/500 to 1/50 of the width of the left image or right image in the horizontal direction. Also, the distance threshold value is set, for example, to the maximum distance at which the feature points can be identified as feature points to correspond to the same part (for example, one to two pixels).

On the other hand, when the maximum value of the normalized cross-correlation value between the template and the right image is less than a predetermined threshold value, the feature point extracting unit 11 might assume that there is no second candidate point in the right image which matches the first candidate point corresponding to that template, and exclude that first candidate point from the search target for a pair of feature points. Similarly, when the maximum value of the normalized cross-correlation value between the re-search template and the left image is less than a predetermined threshold value, the feature point extracting unit 11 might exclude the first candidate point and second candidate point corresponding to that re-search point from the search target for a pair of feature points. As this predetermined threshold value is set higher, the feature point extracting unit 11 is able to improve the reliability that a pair of feature points corresponds to the same part. For example, the predetermined threshold value may be set between 0.9 and 0.95. Alternately, the feature point extracting unit 11 may increase the predetermined threshold value as the number of first candidate points to be extracted from the left image increases. By this means, even when the number of candidate points to be extracted from one image is large, the feature point extracting unit 11 is able to extract only pairs of feature points having a high possibility of corresponding to the same part. Also, even when the number of feature points to be extracted from one image is small, the feature point extracting unit 11 is able to extract a sufficient number of pairs of feature points to find the correction parameters.

Figure 3A:
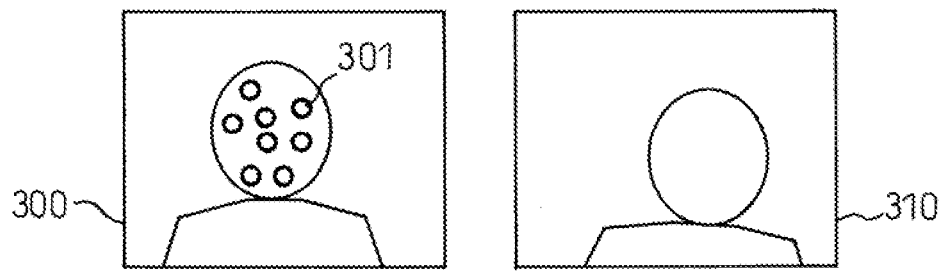
FIG. 3A to FIG. 3C are schematic diagrams illustrating the steps of extracting pairs of feature points.
Figure 3B:
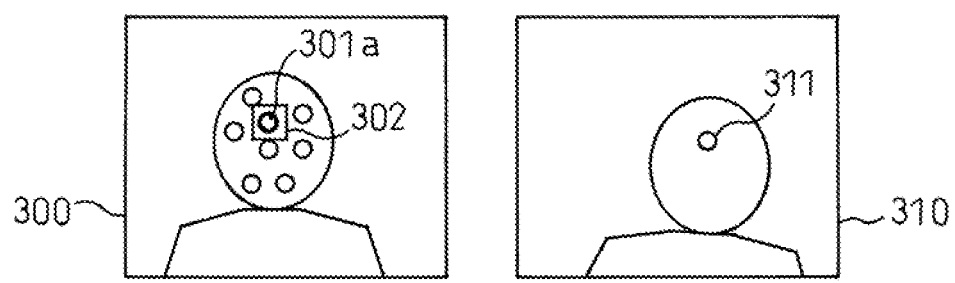
Figure 3C:
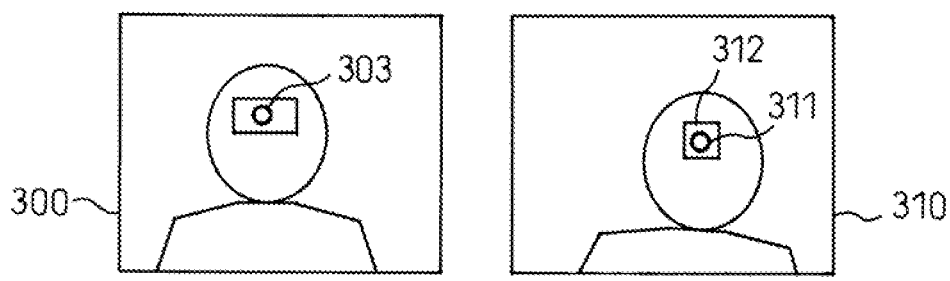

FIG. 3A to FIG. 3C are schematic diagrams illustrating the steps of extracting a pair of feature points according to the present embodiment. In FIG. 3A, from the left image 300, a plurality of first candidate points 301 are extracted. At this point in time, no processing is applied to the right image 310.

Next, as illustrated in FIG. 3B, among the first candidate points extracted from the left image 300, a template 302, which centers around a candidate point 301$a$ of interest, is set. Then, for the right image 310, template matching with a template 302 is performed, and a second candidate point 311 is extracted.

After that, as illustrated in FIG. 3C, based on the right image 310, a re-search template 312 that centers around the second candidate point 311 is set, and template matching between the left image 300 and the re-search template 312 is performed. As a result of this, a third candidate point 303 is extracted, and, if the distance between this third candidate point 303 and the first candidate point 301$a$ is equal to or less than a distance threshold value, the first candidate point 301$a$ (or the third candidate point 303) and the second candidate point 311 are made a pair of feature points.

The feature point extracting unit 11 may first extract the first candidate point from the right image and search for a second candidate point to correspond to that first candidate point in the left image. Furthermore, the feature point extracting unit 11 may associate feature points on the left image and feature points on the right image using various other techniques for associating a plurality of points on an image corresponding to one point on the object.

The feature point extracting unit 11 reports the horizontal coordinate values and vertical coordinate values of two feature points on an image, for every pair of feature points acquired, to the correction parameter calculating unit 12 and the maldistribution degree calculating unit 14.

To correct the deviation between the position of the object captured in the left image and the position of the object captured in the right image, the correction parameter calculating unit 12 calculates a set of correction parameters for correcting the position of the object captured in at least one of the left image and the right image.

Cases might occur where, due to the mounting error that is produced when the camera module 2-1 and camera module 2-2 are mounted, the orientation of one camera module becomes different from the orientation of the other camera module. This difference in orientation might make the position of the object on the left image different from the position of the object on the right image. This difference between the positions of the object can be corrected by subjecting projective transformation of the object on at least one of the images. This projective transformation can be represented by, for example, the following equations.

$$\begin{pmatrix} x' \\ y' \\ 1 \end{pmatrix} = RT \begin{pmatrix} x \\ y \\ 1 \end{pmatrix} \quad \text{(Equation 1)}$$

$$R = \begin{pmatrix} \cos\pi\theta & -\sin\pi\theta & \begin{matrix}-\cos\pi\theta \cdot W/2 + \\ \sin\pi\theta \cdot H/2 + W/2\end{matrix} \\ \sin\pi\theta & \cos\pi\theta & \begin{matrix}-\sin\pi\theta \cdot W/2 - \\ \cos\pi\theta \cdot H/2 + H/2\end{matrix} \\ 0 & 0 & 1 \end{pmatrix}$$

$$T = \begin{pmatrix} 1 & 0 & tx \\ 0 & 1 & ty \\ 0 & 0 & 1 \end{pmatrix}$$

(x, y) are the horizontal direction coordinate and vertical direction coordinate of a point of interest on the image of the correction target, and (x', y') are the horizontal direction coordinate and vertical direction coordinate of the point of interest on the image of the correction target after correction. Also, R is a projective transformation matrix to rotate an arbitrary point on the correction target image, through an angle θ, around the center (W/2, H/2) of an image having a width W in the horizontal direction and a height H in the vertical direction, as the center of rotation. Then, T is a projective transformation matrix to move an arbitrary point on the correction target image over tx pixels in the horizontal direction and ty pixels in the vertical direction. Consequently, the parameters θ, tx and ty of the projective transformation matrices R and T are the correction parameters. Also, assuming that projective transformation is performed using an arbitrary matrix of 3 rows×3 columns, the correction parameter calculating unit 12 may use the nine elements contained in that matrix as correction parameters. Alternately, the correction parameter calculating unit 12 may normalize all of the elements such that, among the nine elements of the projective transformation matrix of 3 rows×3 columns, one of the non-zero elements becomes 1, and use eight elements as correction parameters.

The correction parameter calculating unit 12 determines the parameters θ, tx and ty by, for example, the minimum square method, i.e., using the parameters θ, tx and ty as variables, for each of a plurality of pairs of feature points, the correction parameter calculating unit 12 converts the coordinates of the feature point on at least one of the left image and the right image according to equation 1, and finds the square of the distance between the feature points after the correction. Then, the correction parameter calculating unit 12 finds the mean square value of the distance with respect to each pair of feature points. The correction parameter calculating unit 12 uses the parameters θ, tx and ty to minimize this mean square value as a set of correction parameters. According to the present embodiment, the correction parameter calculating unit 12 finds a set of correction parameters (θ, tx and ty) for performing projective transformation of the left image according to equation 1. However, the correction parameter calculating unit 12 might as well find a set of correction parameters (θ, tx and ty) for performing projective transformation of the right image according to equation 1.

Note that, if the camera modules 2-1 and 2-2 deviate with respect to each other only in one of the vertical direction, the horizontal direction and the direction to rotate around the optical axis, due to the mechanism of mounting the camera modules, the correction parameter calculating unit 12 may find only one of (θ, tx and ty).

The correction parameter calculating unit 12 passes the set of correction parameters (θ, tx and ty) to the correction error calculating unit 13 and the correction unit 17.

Using the set of correction parameters determined by the correction parameter calculating unit 12, the correction error calculating unit 13 converts the coordinates of the feature point of the left mage, and finds the statistic of the distance between the feature point on the left image after the conversion, and the corresponding feature point on the right image, as the amount of correction error.

As the amount of correction error, the correction error calculating unit 13 may calculate, for example, the mean value or mean square value of the respective absolute values of the distance with respect to a plurality of pairs of feature points. The correction error calculating unit 13 reports the amount of correction error to the decision unit 16.

The maldistribution degree calculating unit 14 calculates the degree of maldistribution, which indicates the degree of maldistribution of feature points on either one image, which are included in each of the plurality of pairs of feature points. With the present embodiment, the maldistribution degree calculating unit 14 determines the degree of maldistribution based on a plurality of feature points on the right image. However, the maldistribution degree calculating unit 14 may as well determine the degree of maldistribution based on a plurality of feature points on the left image.

The maldistribution degree calculating unit 14, for example, equally divides the right image into m in the horizontal direction and n in the vertical direction, thereby setting up m×n blocks. In addition, one of m and n is an integer of 2 or greater, and the other one is an integer of 1 or greater. For example, m=n=3 is set. Then, for each block, the maldistribution degree calculating unit 14 determines the number of feature points included in that block. Then, the maldistribution degree calculating unit 14 uses the number of blocks including no feature points or including a smaller number of feature points than a predetermined value, as the degree of maldistribution. The predetermined value is set, for example, to ⅕ to ⅒ of the average value of the number of feature points per block, or set to a fixed value such as 1 to 3.

Figure 4A:
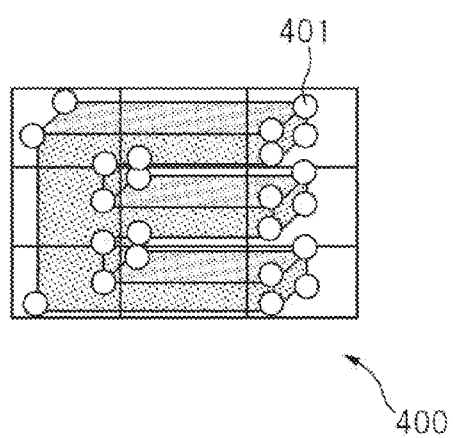
FIG. 4A and FIG. 4B are diagrams, each illustrating one example of the relationship between the distribution and maldistribution of feature points.
Figure 4B:
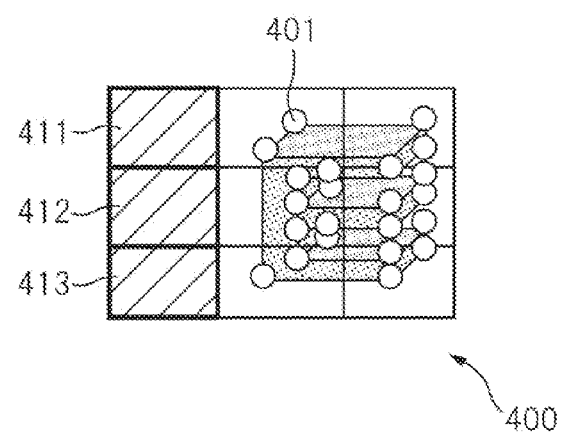

FIG. 4A and FIG. 4B are each a diagram illustrating one example of the relationship between the distribution and the degree of maldistribution of feature points. In FIG. 4A and FIG. 4B, an image 400 is divided into 3×3 blocks. A plurality of points 401 on the image 400 each represent a feature point. In the example illustrated in FIG. 4A, feature points 401 are present in all blocks, and therefore the degree of maldistribution is 0. On the other hand, in the example illustrated in FIG. 4B, none of the three blocks 411 to 413 contains feature points, and the rest of the blocks include more than one feature point 401. Consequently, in this example, the degree of maldistribution is 3.

Note that, if the right image is divided into 3×3 blocks (i.e., m=n=3), the maldistribution degree calculating unit 14 may use the number of blocks including no feature points, among the eight blocks without including the center block, as the degree of maldistribution. This is because, even if the center block does not include feature points, if its surrounding blocks include feature points, given that feature points that are located over the entirety of the right image are used to calculate the correction parameters, it is still possible to assume in effect that feature points are not maldistributed.

Alternately, the maldistribution degree calculating unit 14 may equally divide the right image into two blocks in the horizontal direction or in the vertical direction, and determine the number of feature points included in each block. Then, the maldistribution degree calculating unit 14 calculates the ratio of the number of feature points that are included in the block having the greater number of feature points between the two blocks, to the total number of feature points, as the degree of maldistribution. In addition, it is possible to divide the range of values, which this ratio can take into, a plurality of zones and set a degree of maldistribution in each zone. Then, the maldistribution degree calculating unit 14 may use the degree of maldistribution corresponding to the zone to which the found ratio belongs, as the degree of maldistribution of feature points in the right image.

Alternately, the maldistribution degree calculating unit 14 may calculate the degree of maldistribution according to the following equation:

$$b = \alpha(|m-me|^2/|me|^2) + \beta|s-se|/|se| \qquad \text{(Equation 2)}$$

b is the degree of maldistribution. Also, the function $|a=(ax, ay)|$ is $(a_x^2 + a_y^2)^{1/2}$. Then, α and β are coefficients to satisfy the conditions α≥0, β≥0 and α+β=1. For example, α=β=0.5. W and H are the width of the right image in the horizontal direction and the height of the right image in the vertical direction, respectively. $m=(m_x, m_y)$ represents the mean value of the coordinates of feature points that are located on the right image, where $m_x$ is the mean coordinate in the horizontal direction and $m_y$ is the mean coordinate in the vertical direction. Also, me=(W/2, H/2) represents the mean value of the coordinates of feature points when feature points are located uniformly over the entirety of the right image, i.e., the center coordinates of the image. Furthermore, $s=(s_x, s_y)$ represents the variance of the coordinates of feature points that are located on the right image, where $s_x$ is the variance in the horizontal direction and $s_y$ is the variance in the vertical direction. se=($W^2/12$, $H^2/12$) is the expected value of the variance of feature points when feature points are distributed uniformly over the entirety of the right image, and, for example, the expected value of the variance in the horizontal direction is calculated as follows:

$$\begin{aligned}
&\text{Expected value of variance} \qquad \text{(Equation 3)}\\
&\text{of horizontal components} = \int_{-\infty}^{\infty} p(n)\\
&(n - \text{mean expected value of horizontal components})^2\\
&dn = \int_0^W \frac{1}{W}\left(n - \frac{1}{2}W\right)^2 dn =\\
&\frac{1}{W}\int_0^W n^2 - Wn + \frac{1}{4}W^2 dn =\\
&\frac{1}{W}\left[\frac{1}{3}n^3 - \frac{W}{2}n^2 + \frac{W^2}{4}n\right]_0^W =\\
&\frac{1}{W}\left(\frac{1}{3}W^3 - \frac{1}{2}W^3 + \frac{1}{4}W^3\right) =
\end{aligned}$$

-continued $$\left(\frac{1}{3} - \frac{1}{2} + \frac{1}{4}\right)W^2 = \frac{1}{12}W^2$$

Note that p(n) is the probability the horizontal coordinate of a feature point becomes n, and, given the uniform distribution of the present embodiment, 1/W holds, regardless of the value of n. The expected value of variance in the vertical direction can also be determined likewise. In this case, the maldistribution degree calculating unit 14 may, for example, also divide the range of values which the value that is calculated by the right term of equation 2 into a plurality of zones, and determine the degree of maldistribution according to the zone to which the value calculated by equation 2 belongs.

The maldistribution degree calculating unit 14 reports the determined degree of maldistribution to the threshold value determining unit 15.

The threshold value determining unit 15 determines a threshold value to serve as the tolerable upper limit value of the amount of correction error, according to the degree of maldistribution of feature points.

As the degree of maldistribution of feature points becomes higher, the mean square value of the distance between each of a plurality of points on the object in one image, corrected by a set of correction parameters that are determined based on the feature points, and the corresponding point of the object in the other image, may become greater. Note that, hereinafter, for ease of explanation, this mean square value of distance will be referred to as residual error mean. The inventors has found that there is a certain correlation relationship between the probability that the residual error mean becomes equal to or lower than a tolerable upper limit and the amount of correction error, and that this correlation relationship changes with the degree of maldistribution. In other words, as the amount of correction error increases greater, the probability that the residual error mean becomes equal to or lower than the tolerable upper limit decreases. Then, the amount of correction error to achieve the probability P that the residual error mean becomes equal to below the tolerable upper limit when the degree of maldistribution is high, becomes lower than the amount of correction error to achieve the probability P when the degree of maldistribution is low. In other words, when the degree of maldistribution b1 is greater than the degree of maldistribution b2, the amount of correction error eb1 to achieve the above probability P when the degree of maldistribution is b1, is lower than the amount of correction error eb2 to achieve the probability P when the degree of maldistribution is b2. Consequently, even when the degree of maldistribution is high, as long as the amount of correction error is small enough, a set of correction parameters is estimated to be adequate to generate a stereoscopic image. On the other hand, even when the degree of maldistribution is low, if the amount of correction error is large, a set of correction parameters is estimated to be inadequate to generate a stereoscopic image.

FIG. 5A is a diagram illustrating one example of the relationship between the amount of correction error, and the probability that the residual error mean is equal to or lower than a tolerable upper limit when the degree of maldistribution of feature points is relatively low. On the other hand, FIG. 5B is a diagram illustrating one example of the relationship between the amount of correction error, and the probability that the residual error mean is equal to or lower than a tolerable upper limit when the degree of maldistribution of feature points is relatively high. The tolerable upper limit is set, for example, to the upper limit value of residual error mean, which defines the range in which the quality of the stereoscopic image that is formed by left image and right image after the correction is tolerable. Also, hereinafter, the probability that the residual error mean becomes equal to or lower than the tolerable upper limit will be referred to as the correction success rate.

In FIG. 5A and FIG. 5B, the horizontal axis represents the amount of correction error and the vertical axis represents the correction success rate. Also, in FIG. 5A, the graph 500 illustrates the relationship of the correction success rate, with respect to the amount of correction error when the degree of maldistribution of feature points is relatively low. On the other hand, in FIG. 5B, the graph 510 illustrates the relationship of the correction success rate, with respect to the amount of correction error when the degree of maldistribution of feature points is relatively high. In comparing the graph 500 and the graph 510 it is clear that, when the degree of maldistribution is greater, the upper limit of the amount of correction error corresponding to a specific correction success rate becomes smaller. For example, the upper limit $UL_1$ for the amount of correction error, which is used when the degree of maldistribution is relatively low and which corresponds to the correction success rate 70%, is greater than the upper limit $UL_2$ for the amount of correction error when the degree of maldistribution is relatively high.

Furthermore, as illustrated by the graphs 500 and 510, when the amount of correction error is relatively low, the degree of change of the correction success rate following change of the amount of correction error is low, regardless of the degree of maldistribution. However, when the amount of correction error grows large to a certain extent, the correction success rate decreases rapidly following increase of the amount of correction error. When the amount of correction error increases further, then, the correction success rate decreases moderately even if the amount of correction error increases, i.e., the relational equation to represent the relationship between the amount of correction error and the correction success rate can be determined, for example, according to a logistic function like the following equation:

$$r = \frac{\alpha}{1 + \exp(\beta \times \alpha \times (\gamma - e \times \delta_b))} \quad \text{(Equation 4)}$$

e represents the amount of correction error, and r represents the correction success rate. Also, α, β and γ are each a coefficient. Also, $\delta_b$ is the coefficient that is determined per degree of maldistribution b (b=0, 1, 2, ..., Bmax, where Bmax is the maximum value which the degree of maldistribution can take). In particular, the coefficient $\delta_b$ assumes a greater value as the degree of maldistribution b increases greater. By this means, when the degree of maldistribution b increases, the correction success rate r with respect to the amount of correction error e decreases.

The coefficients α, β, γ and $\delta_b$ are determined in advance following, for example, the steps below.

Based on a plurality of pieces of sample data, which are pairs of left images and right images prepared in advance per degree of maldistribution, the correction success rates ri (i=1, 2, ..., n) for a plurality of amounts of correction error ei (i=1, 2, ..., n) (n is an integer of 2 or greater) are calculated, per degree of maldistribution. It is assumed that, for each sample data, whether or not the stereoscopic image that is generated using a set of correction parameters calculated from that sample data has been corrected successfully (i.e., whether or not the residual error mean is equal to or lower than a tolerable upper limit), is known. Then, by performing a regression analysis for every degree of maldistribution using the coefficients $\alpha$, $\beta$, $\gamma$ and $\delta_b$ as variables, the coefficients $\alpha$, $\beta$, $\gamma$ and $\delta_b$ are determined when the square error mean between the calculated value r'i of the correction success rate, which is calculated by inputting the amount of correction error ei in equation 4, and the correction success rate ri, is the minimum.

Note that, for the regression analysis, for example, the steepest descent method, the simulated annealing method or the Boltzmann machine may be used. If hardware resources for calculating the coefficients $\alpha$, $\beta$, $\gamma$ and $\delta_b$ are limited, or if the time for calculating the coefficients $\alpha$, $\beta$, $\gamma$ and $\delta_b$, is limited, for example, the steepest descent method may be used. On the other hand, if there are a plenty of hardware resources and time to calculate the coefficients $\alpha$, $\beta$, $\gamma$ and $\delta_b$, for example, the simulated annealing method or the Boltzmann machine may be used to find global optimal solutions for these coefficients.

For example, when the degree of maldistribution b is represented by the number of blocks in which there are no feature points when an image is divided into 3×3 blocks, the coefficients $\alpha$, $\beta$, and $\gamma$, and the coefficients $\delta_b$ for the degrees of maldistribution b=0, 1 and 2, are calculated as follows.

$\alpha = 1.427$
$\beta = -0.004315$
$\gamma = 1115.969$
$\delta_0 = 0.985$
$\delta_1 = 1.587$
$\delta_2 = 2.747$ These coefficients are stored in, for example, a memory circuit provided in the threshold value determining unit 15, in association with the corresponding degrees of maldistribution.

The threshold value determining unit 15 determines the value of each coefficient in equation 4 according to the degree of maldistribution. Then, by substituting a tolerable lower limit value (for example, 70%) for the correction success rate that is provided in advance, in equation 4, the threshold value determining unit 15 calculates the amount of correction error to correspond to that tolerable lower limit value as a threshold value Th to represent the upper limit of the amount of correction error. By this means, when the degree of maldistribution is greater, the threshold value Th becomes smaller.

Note that the threshold value Th per degree of maldistribution may be calculated in advance using equation 4 and the coefficients per degree of maldistribution. In this case, in the memory circuit provided in the threshold value determining unit 15, a reference table to represent the relationship between the degree of maldistribution and threshold value Th, is stored. Then, by referencing that reference table, the threshold value determining unit 15 determines the threshold value Th to match the degree of maldistribution.

Note that the equation to represent the relationship between the amount of correction error and the correction success rate does not have to be a logistic function. For example, the equation representing the relationship between the amount of correction error e and the correction success rate r may be represented by a monotonically decreasing function using a logarithm, like the following equation:

$$r = \alpha_b \times \log(\beta_b \times e) + \gamma_b \quad \text{(Equation 5)}$$

$\alpha_b$, $\beta_b$ and $\gamma_b$ are the coefficients at the degree of maldistribution b. In this case, too, the coefficients $\alpha_b$, $\beta_b$ and $\gamma_b$, are determined by a regression analysis, based on a plurality of pairs of sample images that are prepared in advance. When the degree of maldistribution b is represented by the number of blocks having no feature points, when an image such as described above is divided into 3×3 blocks, the coefficients $\alpha_b$, $\beta_b$ and $\gamma_b$ are calculated as follows:

$\alpha_0 = -0.1565$, $\beta_0 = 0.9847$, $\gamma_0 = 1.318$ $\alpha_1 = -0.2019$, $\beta_1 = 0.9689$, $\gamma_1 = 1.439$ $\alpha_2 = -0.2202$, $\beta_2 = 0.9716$, $\gamma_2 = 1.427$ Alternately, the equation to represent the relationship between the amount of correction error e and the correction success rate r may be expressed as follows:

$$r = \alpha_b \times \sqrt{e} + \beta_b / \sqrt{e} + \gamma_b \quad \text{(Equation 6)}$$

$\alpha_b$, $\beta_b$ and $\gamma_b$ are coefficients at the degree of maldistribution b. In this case, too, the coefficients $\alpha_b$, $\beta_b$ and $\gamma_b$ are determined by a regression analysis based on a plurality of pieces of sample data that are prepared in advance. When the degree of maldistribution b is represented by the number of blocks having no feature points, when an image such as described above is divided into 3×3 blocks, the coefficients $\alpha_b$, $\beta_b$ and $\gamma_b$ are calculated as follows:

$\alpha_0 = -0.04830$, $\beta_0 = -0.5471$, $\gamma_0 = 1.265$ $\alpha_1 = -0.04342$, $\beta_1 = -0.06755$, $\gamma_1 = 1.101$ $\alpha_2 = -0.03149$, $\beta_2 = 0.8236$, $\gamma_2 = 0.7643$ Note that, even when the degree of maldistribution is determined by a different basis from the number of blocks having no feature points, the relational equation between the amount of correction error and the correction success rate is found per degree of maldistribution. Threshold value determining unit 15 reports the determined threshold value Th to the decision unit 16.

If the amount of correction error is equal to or lower than the threshold value Th that is determined by the threshold value determining unit 15, the decision unit 16 decides that the set of correction parameters is adequate to generate a stereoscopic image. On the other hand, when the amount of correction error is greater than the threshold value Th, the decision unit 16 decides that the set of correction parameters is inadequate to generate a stereoscopic image.

The decision unit 16, upon deciding that a set of correction parameters is adequate, reports that to the correction unit 17. On the other hand, upon deciding that a set of correction parameters is inadequate, the decision unit 16 makes the correction unit 17 discard that set of correction parameters. Then, the stereoscopic image generating device 6 reports a signal to represent that an adequate set of correction parameters has not been obtained, to the control unit 7 of the digital camera 1. Upon receiving that signal, the control unit 7 reports a message, which asks to take a photograph again, via the display unit 4. Then, the stereoscopic image generating device 6 may acquire the left image and the right image again from the camera modules 2-1 and 2-2, and determine a set of correction parameters again, based on the newly acquired left image and right image.

The correction unit 17 generates a stereoscopic image by correcting at least one of the position of the object on the left image and the position of the object on the right image, using a set of correction parameters that has been decided to be adequate. With the present embodiment, the correction unit 17 performs projective transformation of the pixels of the left image, according to the equation given by applying the set of correction parameters to equation 1. Then, the pair of the left image and right image acquired thus becomes a stereoscopic image.

Note that the correction unit 17 may as well correct the positions of pixels in the right image, instead of correcting the positions of pixels in the left image. In this case, the correction unit 17 has only to make the set of correction parameters (θ, tx and ty) in equation 1 be (−θ, −tx and −ty). The correction unit 17 may also correct the positions of pixels in the left image and the positions of pixels in the right image, according to equation 1. In this case, the set of correction parameters to be applied to the left image may be (θ/2, tx/2 and ty/2), and, on the other hand, the set of correction parameters to be applied to the right image may be (−θ/2, −tx/2 and −ty/2).

The stereoscopic image generating device 6 may have the acquired stereoscopic image displayed on the display unit 4 or have the acquired stereoscopic image stored in the storage unit 5.

FIG. 6 is an operation flowchart of the stereoscopic image generation process executed by the stereoscopic image generating device 6.

The stereoscopic image generating device 6 acquires the left image from the camera module 2-1 and acquires the right image from the camera module 2-2 (step S101). Then, the stereoscopic image generating device 6 stores the left image and right image in the buffer 10.

The feature point extracting unit 11 reads the left image and right image from the buffer 10, and, from each of the left image and right image, extracts a plurality of pairs of feature points corresponding to the same points on the object (step S102). Then, the feature point extracting unit 11 passes the coordinates of each feature point included in these pairs of feature points, to the correction parameter calculating unit 12 and the maldistribution degree calculating unit 14.

The correction parameter calculating unit 12 calculates a set of correction parameters from a pair of feature points (step S103). Then, the correction parameter calculating unit 12 passes the set of correction parameters to the correction error calculating unit 13 and correction unit 17.

The correction error calculating unit 13 corrects the positions of feature points in at least one of the left image and the right image using the set of correction parameters. Then, the correction error calculating unit 13 calculates the square of the distance between the corrected feature points, per pair of feature points, and calculates their mean value as the amount of correction error e (step S104). The correction error calculating unit 13 passes the amount of correction error e to the decision unit 16.

The maldistribution degree calculating unit 14 calculates the degree of maldistribution of feature points with respect to either the left image or the right image (step S105). Then, the maldistribution degree calculating unit 14 passes the degree of maldistribution to the threshold value determining unit 15. The threshold value determining unit 15 determines the threshold value Th such that, when the degree of maldistribution is greater, the threshold value Th for the amount of correction error e becomes smaller (step S106). Then, the threshold value determining unit 15 passes the threshold value Th to a decision unit 16.

The decision unit 16 decides whether or not the amount of correction error e is equal to or lower than the threshold value Th (step S107). When the amount of correction error is greater than the threshold value Th (step S107: No), the decision unit 16 decides that the set of correction parameters is inadequate to generate a stereoscopic image. Then, the decision unit 16 commands the correction unit 17 to discard the set of correction parameters. Also, the stereoscopic image generating device 6 outputs a signal to command to acquire images again, to the control unit 7 of the digital camera 1 (step S108). After that, the digital camera 1 takes photographs again, and, when a new left image and right image are generated, the stereoscopic image generating device 6 repeats the processes of step S101 and onward.

On the other hand, when the amount of correction error e is equal to or lower than the threshold value Th (step S107: Yes), the decision unit 16 decides that the set of correction parameters is adequate to generate a stereoscopic image. Then, the decision unit 16 reports that the set of correction parameters is adequate, to the correction unit 17. Upon receiving that report, the correction unit 17 receives the left image and right image from the buffer 10, and generates a stereoscopic image by correcting the positions of pixels in at least one of the left image and right image, using the set of correction parameters (step S109). Then, the stereoscopic image generating device 6 outputs the generated stereoscopic image, and finishes the stereoscopic image generation process.

Note that the stereoscopic image generating device 6 may execute the processes of steps S103 and S104 and the processes of steps S105 and S106 in parallel, or may switch the order of the processes of steps S103 and S104 the processes of steps S105 and S106.

As described above, this stereoscopic image generating device decides whether or not a set of correction parameters is adequate, based on a result of comparison of the amount of correction error and a threshold value that is determined according to the degree of maldistribution of feature points in the left image or the right image. By this means, even if, for example, feature points that are used to calculate the set of correction parameters are maldistributed, it is possible to utilize adequate correction parameters without discarding these.

Next, the stereoscopic image generating device according to a second embodiment will be described. This stereoscopic image generating device, once calculating a set of correction parameters by executing a calibration process, stores that set of correction parameters. Then, given pair of a left image and a right image acquired later, this stereoscopic image generating device generates a stereoscopic image by correcting the position of the object in at least one image using that set of correction parameters.

FIG. 7 is a configuration diagram of the stereoscopic image generating device according to the second embodiment. A stereoscopic image generating device 61 according to the second embodiment includes a buffer 10, a feature point extracting unit 11, a correction parameter calculating unit 12, a correction error calculating unit 13, a maldistribution degree calculating unit 14, a threshold value determining unit 15, a decision unit 16, a correction unit 17 and a correction parameter storage unit 18. In FIG. 7, the units of the stereoscopic image generating device 61 are assigned the same reference numerals as the reference numerals of the corresponding components of the stereoscopic image generating device 6 of the first embodiment illustrated in FIG. 2.

The stereoscopic image generating device 61 according to the second embodiment differs from the stereoscopic image generating device 6 according to the first embodiment in respect to the correction parameter storage unit 18. Therefore, the correction parameter storage unit 18 and its related parts will be described below. As for the other components of the stereoscopic image generating device 61, see the descriptions of the corresponding components of the stereoscopic image generating device according to the first embodiment.

The correction parameter storage unit 18 has, for example, a non-volatile, readable and writable semiconductor memory circuit, and stores a set of correction parameters.

According to this embodiment, a set of correction parameters is found, for example, when a calibration process of the digital camera in which the stereoscopic image generating device 61 is mounted is executed, as the step S101 to S108 in the operation flowchart illustrated in FIG. 6 are executed. To be more specific, the set of correction parameters that is calculated by the correction parameter calculating unit 12 in step S103 is stored in the correction parameter storage unit 18. After that, in step S107, when the amount of correction error e is greater than the threshold value Th, the decision unit 16 decides that the set of correction parameters is inadequate to generate a stereoscopic image, and removes the set of correction parameters from the correction parameter storage unit 18. Then, stereoscopic image generating device 61 repeats the processes of step S101 and onward. On the other hand, in step S107, when the amount of correction error e is equal to or lower than the threshold value Th, the stereoscopic image generating device 61 finishes the calibration process.

Alternately, upon normal photographing, the stereoscopic image generating device 61 executes only the process of step S109, without performing the processes of steps S101 to S108. To be more specific, the correction unit 17, every time acquiring a left image and a right image from the camera modules 2-1 and 2-2, corrects the positions of pixels in at least one of the left image and the right image, according to equation 1, using a set of correction parameters stored in the correction parameter storage unit 18. By this means, the stereoscopic image generating device 61 generates a stereoscopic image.

According to this second embodiment, the stereoscopic image generating device does not have to calculate a set of correction parameters every time taking a photograph, and therefore can reduce the amount of calculation for generating a stereoscopic image upon photographing.

Next, the stereoscopic image generating device according to a third embodiment will be described. This stereoscopic image generating device stores sample data for determining the threshold value for the amount of correction error, and, using that sample data, the threshold value determining unit determines the relationship between the amount of correction error and the correction success rate per degree of maldistribution.

FIG. 8 is a configuration diagram of the stereoscopic image generating device according to the third embodiment. A stereoscopic image generating device 62 according to the third embodiment includes a buffer 10, a feature point extracting unit 11, a correction parameter calculating unit 12, a correction error calculating unit 13, a maldistribution degree calculating unit 14, a threshold value determining unit 15, a decision unit 16, a correction unit 17 and a sample storage unit 19. In FIG. 8, the units of the stereoscopic image generating device 62 are assigned the same reference numerals as the reference numerals of the corresponding components of the stereoscopic image generating device 6 of the first embodiment illustrated in FIG. 2.

The stereoscopic image generating device 62 according to the third embodiment differs from the stereoscopic image generating device 6 according to the first embodiment in respect to the sample storage unit 19 and the threshold value determining unit 15. The sample storage unit 19 and the threshold value determining unit 15 will be described below. As for the other components of the stereoscopic image generating device 62, see the descriptions of the corresponding components of the stereoscopic image generating device according to the first embodiment.

The sample storage unit 19 has, for example, a non-volatile semiconductor memory circuit. Then, the sample storage unit 19 stores the sample data to use to determine the relationship between the amount of correction error and the correction success rate per degree of maldistribution of feature points. This sample data includes, for example, various amounts of correction error provided per degree of maldistribution, and the correction success rates at respective amounts of correction error.

The threshold value determining unit 15 determines the relational equation of the amount of correction error and the correction success rate, using the sample data stored in the sample storage unit 19, upon determining the threshold value for the amount of correction error. Then, the threshold value determining unit 15 uses the amount of correction error corresponding to the correction success rate that is set in advance, as the threshold value for that amount of correction error.

With this embodiment, the degree of maldistribution is determined in advance, so that the threshold value determining unit 15 has only to determine the relational equation of the amount of correction error and the correction success rate using only the sample data corresponding to that degree of maldistribution. Alternately, the relational equation between the amount of correction error and the correction success rate is represented by, for example, one of equations 4 to 6, as described earlier with respect to the first embodiment. Then, the coefficients to be used in that relational equation are determined by performing a regression analysis of the correction success rate per amount of correction error, as described earlier.

According to this third embodiment, the stereoscopic image generating device itself is able to determine the relational equation between the amount of correction error and the correction success rate. Consequently, this stereoscopic image generating device is able to determine the threshold value for the amount of correction error, without storing in advance the relational equation of the amount of correction error and the correction success rate.

Next, the stereoscopic image generating device according to a fourth embodiment will be described. When the angle of view and the number of pixels of a camera module as of when the relational equation between the amount of correction error and the correction success rate is calculated, differ from the angle of view and the number of pixels of the camera module as of when a set of correction parameters is calculated, the amount of correction error is corrected according to that difference in the angle of view and the number of pixels. By this means, this stereoscopic image generating device determines an adequate threshold value.

FIG. 9 is a configuration diagram of a stereoscopic image generating device according to the fourth embodiment. The stereoscopic image generating device 63 according to the fourth embodiment includes a buffer 10, a feature point extracting unit 11, a correction parameter calculating unit 12, a correction error calculating unit 13, a maldistribution degree calculating unit 14, a threshold value determining unit 15, a decision unit 16, a correction unit 17 and a correction error adjustment unit 20. In FIG. 9, the units of the stereoscopic image generating device 63 are assigned the same reference numerals as the reference numerals of the corresponding components of the stereoscopic image generating device 6 of the first embodiment illustrated in FIG. 2.

The stereoscopic image generating device 63 according to the fourth embodiment differs from the stereoscopic image generating device 6 according to the first embodiment in respect to the correction error adjustment unit 20. The correction error adjustment unit 20 will be described below. As for the other components of the stereoscopic image generating device 63, see the descriptions of the corresponding components of the stereoscopic image generating device according to the first embodiment.

According to this embodiment, the correction error adjustment unit 20 stores the angle of view and the number of pixels of the camera modules as of when a pair of images used to calculate the amount of correction error and the correction success rate is generated. Hereinafter, for ease of explanation, the angle of view and the number of pixels will be referred to as the reference angle of view and the reference number of pixels, respectively. Also, the stereoscopic image generating device 63 acquires information to represent the angle of view and the number of pixels of the camera modules as of when the left image and right image used to calculate a set of correction parameters is generated, from the control unit of the digital camera. Then, the stereoscopic image generating device 63 passes that information to the correction error adjustment unit 20, with the amount of correction error calculated by the correction error calculating unit 13. Hereinafter, for ease of explanation, the angle of view and the number of pixels of the camera modules at the time a set of correction parameters is calculated will be referred to as the effective angle of view and the effective number of pixels, respectively.

The correction error adjustment unit 20 adjusts the amount of correction error such that the difference between the effective angle of view and effective number of pixels, and the reference angle of view and reference number of pixels, is cancelled.

When the reference angle of view with respect to the vertical direction is $\phi$, the distance d in the vertical direction on the object plane corresponding one pixel on the image and corresponding to the imaging plane of the camera modules (i.e., the front focal plane of the imaging optical system provided in the camera modules) is represented by the following equation:

$$d = 2 \cdot \tan(\phi/2) \cdot s / H_Q \quad \text{(Equation 7)}$$

s is the distance from the front principal point in the imaging optical system provided in the camera modules to the object plane, and $H_0$ is the reference number of pixels in the vertical direction. Similarly, when the effective angle of view in the vertical direction is $\phi'$, the distance d' in the vertical direction on the object plane, corresponding to 1 pixel on the image, is represented by the following equation:

$$d' = 2 \cdot \tan(\phi'/2) \cdot s / H \quad \text{(Equation 8)}$$

s is the distance from the front principal point in the imaging optical system provided in the camera modules to the object plane, and H is the effective number of pixels in the vertical direction.

Consequently, based on the assumption that the distance from the front principal point in the imaging optical system provided in the camera modules to the object plane is equal when the correction parameters are calculated and when images for determining the relationship between the amount of correction error and the correction success rate are calculated, the correction error adjustment unit 20 is able to adjust the amount of correction error by the following the equation:

$$e_c = e \cdot (d/d')^2 = e((\tan(\phi/2) \cdot H)/(\tan(\phi'/2) \cdot H_0))^2 \quad \text{(Equation 9)}$$

e is the amount of correction error before adjustment, and ec is the amount of correction error after adjustment. Also, in this example, the amount of correction error is the mean square of the distance between feature points per pair of feature points. In the cases where the amount of correction error is the mean of the absolute value of the distance between feature points per pair of feature points, the right term of equation 9, $((\tan(\phi/2)H)/(\tan(\phi'/2)H_0)^2$, has only to be made $((\tan(\phi/2)H)/(\tan(\phi'/2)H_0))$.

The correction error amount adjustment unit 20 passes the amount of correction error after adjustment, to the decision unit 16. The decision unit 16 decides that a set of correction parameters is adequate if the amount of correction error after adjustment is equal to or lower than a threshold value that is determined according to the degree of maldistribution of feature points. On the other hand, if the amount of correction error after adjustment is greater than the threshold value that is determined according to the degree of maldistribution of feature points, the decision unit 16 decides that the set of correction parameters is inadequate.

The stereoscopic image generating device according to the fourth embodiment is able to decide whether or not a set of correction parameters is adequate, even if the reference angle of view and the reference number of pixels, and the effective angle of view and the effective number of pixels, are different.

According to a variation, the threshold value determining unit of the stereoscopic image generating device according to the third embodiment may store the reference angle of view and the reference number of pixels. In this case, if only one of the reference angle of view and the reference number of pixels is different from the effective angle of view or the effective number of pixels of the camera modules of the digital camera in which the stereoscopic image generating device is mounted, the threshold value determining unit adjusts the amount of correction error determined with respect to a pair of sample images, according to equation 9. Note that, in this case, in equation 9, ec corresponds to the amount of correction error that is determined with respect to a pair of sample images, and e corresponds to the amount of correction error after adjustment. Then, the threshold value determining unit has only to determine the relational equation of the amount of correction error after adjustment and the correction success rate, by a regression analysis.

The functions of the units of the stereoscopic image generating devices according to the above embodiments or their variations may be implemented by a computer program to be executed on a processor. Such a computer program may be provided recorded on a computer-readable recording medium such as a magnetic recording medium, optical recording medium, and so on.

FIG. 10 is configuration diagram of a computer that operates as a stereoscopic image generating device according to an embodiment described above or its variation, as a computer program to realize the functions of the units of the stereoscopic image generating device operates.

The computer 100 includes a user interface unit 101, a communication interface unit 102, a storage unit 103, a storage medium access device 104, and a processor 105. The processor 105 is connected with the user interface unit 101, the communication interface unit 102, the storage unit 103 and the storage medium access device 104, via a bus, for example.

The user interface unit 101 includes, for example, an input device such as a keyboard and a mouse, and a display device such as a liquid crystal display. Alternately, the user interface unit 101 may include a device that integrates an input device and a display device, such as a touch panel display. Then, the user interface unit 101 outputs, for example, an operation signal to start the process of generating a stereoscopic image, in response to user operation, to the processor 105.

The communication interface unit 102 may have a communication interface for connecting the computer 100 with an imaging device (not illustrated) having two camera modules, or with two cameras that are arranged to photograph the same object, and its control circuit. This communication interface may be made, for example, a universal serial bus (USB).

Furthermore, the communication interface unit 102 may include a communication interface for connecting with a communication network in compliance with a communication standard such as Ethernet (registered trademark), and its control circuit.

In this case, the communication interface unit 102 acquires the left image and right image from the imaging device, camera, or other devices that are connected with the communication network, and passes the left image and right image to the processor 105. Also, the communication interface unit 102 may output a stereoscopic image that is received from the processor 105, to other devices via the communication network.

The storage unit 103 includes, for example, a readable and writable semiconductor memory and a read-only semiconductor memory. Then, the storage unit 103 stores a computer program to be executed on the processor 105 to implement the stereoscopic image generation process, and data to be used in the stereoscopic image generation process, such as the relational equation between the amount of correction error and the correction success rate per degree of maldistribution. Also, the storage unit 103 stores the left images, right image, and stereoscopic images that are generated by the processor 105.

The storage medium access device 104 is a device to access the storage medium 106, which is, for example, a magnetic disk, a semiconductor memory card, or an optical storage medium. The storage medium access device 104 reads the computer program for the stereoscopic image generation process, that is stored in the storage medium 106 and that is executed on the processor 105, to the processor 105. The storage medium access device 104 may also write stereoscopic images that are generated by the processor 105, in the storage medium 106.

By executing a computer program for stereoscopic image generation process according to either one of the above-described embodiments, or its modification, the processor 105 generates a stereoscopic image from a pair of a left image and right image. Then, the processor 105 stores the generated stereoscopic image in the storage unit 103, or outputs this stereoscopic image to other devices via the communication interface unit 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A stereoscopic image generating device comprising:
    a feature point extracting unit that extracts, from a first image that is generated by photographing an object by a first camera, and a second image that is generated by photographing the object by a second camera, a plurality of pairs of feature points corresponding to same points on the object;
    a correction parameter calculating unit that calculates at least one correction parameter to correct deviation between a position of the object on the first image and the position of the object on the second image, based on the plurality of pairs of feature points;
    a correction error calculating unit that, for each of the plurality of pairs of feature points, corrects a position of the feature point of at least one of the first image and the second image using the correction parameter, finds a distance between feature points corresponding to same point on the object after the correction, and calculates an amount of correction error which represents a statistic of the distance;
    a maldistribution degree calculating unit that finds a degree of maldistribution of feature points by dividing the first image or the second image into m in the horizontal direction and n in the vertical direction, thereby setting up m×n blocks, m and n being an integer and at least one of m and n being greater than 1, and calculating, for each block, the number of feature points included in the block, and using the number of blocks including no feature points or including a smaller number of feature points than a predetermined value, as the degree of maldistribution;
    a threshold value determining unit that sets the amount of correction error as of when a probability that an adequate stereoscopic image is generated by performing correction using the correction parameter, is a predetermined value, as the threshold value, based on a relational equation to represent a relationship between the probability and the amount of correction error, determined per degree of maldistribution;
    a decision unit that discards the correction parameter when the amount of correction error is greater than the threshold value; and
    a correction unit that, when the amount of correction error is equal to or lower than the threshold value, generates a stereoscopic image by correcting at least one of the position of the object on the first image and the position of the object on the second image using the correction parameter.

2. The stereoscopic image generating device as claimed in claim 1, wherein the relational equation is a function that the probability decreases monotonically as the amount of correction error increases greater, and the amount of correction error corresponding to the predetermined value of the probability becomes smaller as the degree of maldistribution becomes higher.

3. The stereoscopic image generating device as claimed in claim 1, wherein the maldistribution degree calculating unit divides one of the first image and the second image into a plurality of blocks, and determines the number of blocks in which there are no feature points, among the plurality of blocks, as the degree of maldistribution.

4. A stereoscopic image generating method comprising:
    extracting, from a first image that is generated by photographing an object by a first camera, and a second image that is generated by photographing the object by a second camera, a plurality of pairs of feature points corresponding to same points on the object;
    calculating at least one correction parameter to correct deviation between a position of the object on the first image and the position of the object on the second image, based on the plurality of pairs of feature points;
    for each of the plurality of pairs of feature points, correcting a position of the feature point of at least one of the first image and the second image using the correction parameter, finding a distance between feature points corresponding to same point on the object after the correction, and calculating an amount of correction error which represents a statistic of the distance;

finding a degree of maldistribution of feature points by dividing the first image or the second image into m in the horizontal direction and n in the vertical direction, thereby setting up m×n blocks, m and n being an integer and at least one of m and n being greater than 1, and calculating, for each block, the number of feature points included in the block, and using the number of blocks including no feature points or including a smaller number of feature points than a predetermined value, as the degree of maldistribution;

setting the amount of correction error as of when a probability that an adequate stereoscopic image is generated by performing correction using the correction parameter, is a predetermined value, as the threshold value, based on a relational equation to represent a relationship between the probability and the amount of correction error, determined per degree of maldistribution;

discarding the correction parameter when the amount of correction error is greater than the threshold value; and when the amount of correction error is equal to or lower than the threshold value, generating a stereoscopic image by correcting at least one of the position of the object on the first image and the position of the object on the second image using the correction parameter.

5. The stereoscopic image generating method as claimed in claim 4, wherein the relational equation is a function that the probability decreases monotonically as the amount of correction error increases greater, and the amount of correction error corresponding to the predetermined value of the probability becomes smaller as the degree of maldistribution becomes higher.

6. The stereoscopic image generating method as claimed in claim 4, wherein the finding the degree of maldistribution comprises: dividing one of the first image and the second image into a plurality of blocks, and determining the number of blocks in which there are no feature points, among the plurality of blocks, as the degree of maldistribution.

7. A non-transitory computer readable recording medium storing a computer program for generating a stereoscopic image, the computer program causing a computer to execute:

extracting, from a first image that is generated by photographing an object by a first camera, and a second image that is generated by photographing the object by a second camera, a plurality of pairs of feature points corresponding to same points on the object;

calculating at least one correction parameter to correct deviation between a position of the object on the first image and the position of the object on the second image, based on the plurality of pairs of feature points;

for each of the plurality of pairs of feature points, correcting a position of the feature point of at least one of the first image and the second image using the correction parameter, finding a distance between feature points corresponding to same point on the object after the correction, and calculating an amount of correction error which represents a statistic of the distance;

finding a degree of maldistribution of feature points by dividing the first image or the second image into m in the horizontal direction and n in the vertical direction, thereby setting up m×n blocks, m and n being an integer and at least one of m and n being greater than 1, and calculating, for each block, the number of feature points included in the block, and using the number of blocks including no feature points or including a smaller number of feature points than a predetermined value, as the degree of maldistribution;

setting the amount of correction error as of when a probability that an adequate stereoscopic image is generated by performing correction using the correction parameter, is a predetermined value, as the threshold value, based on a relational equation to represent a relationship between the probability and the amount of correction error, determined per degree of maldistribution;

discarding the correction parameter when the amount of correction error is greater than the threshold value; and when the amount of correction error is equal to or lower than the threshold value, generating a stereoscopic image by correcting at least one of the position of the object on the first image and the position of the object on the second image using the correction parameter.

8. A stereoscopic imaging device, comprising:

a first imaging unit that generates a first image by photographing an object;

a second imaging unit that is arranged in a different position from the first imaging unit, and that generates a second image by photographing the object; and a processor adapted to:

extract a plurality of pairs of feature points corresponding to same points on the object, from the first image and the second image;

calculate at least one correction parameter to correct deviation between a position of the object on the first image and the position of the object on the second image, based on the plurality of pairs of feature points;

for each of the plurality of pairs of feature points, correct a position of the feature point of at least one of the first image and the second image using the correction parameter, find a distance between feature points corresponding to same point on the object after the correction, and calculate an amount of correction error which represents a statistic of the distance;

find a degree of maldistribution of feature points by dividing the first image or the second image into m in the horizontal direction and n in the vertical direction, thereby setting up m×n blocks, m and n being an integer and at least one of m and n being greater than 1, and calculating, for each block, the number of feature points included in the block, and using the number of blocks including no feature points or including a smaller number of feature points than a predetermined value, as the degree of maldistribution;

set the amount of correction error as of when a probability that an adequate stereoscopic image is generated by performing correction using the correction parameter, is a predetermined value, as the threshold value, based on a relational equation to represent a relationship between the probability and the amount of correction error, determined per degree of maldistribution;

discard the correction parameter when the amount of correction error is greater than the threshold value; and when the amount of correction error is equal to or lower than the threshold value, generate a stereoscopic image by correcting at least one of the position of the object on the first image and the position of the object on the second image using the correction parameter.

* * * * *